United States Patent [19]

Pauliny et al.

[11] Patent Number: 5,827,791

[45] Date of Patent: Oct. 27, 1998

[54] FACECOAT CERAMIC SLURRY AND METHODS FOR USE THEREOF IN MOLD FABRICATION AND CASTING

[75] Inventors: Thomas A. Pauliny, Salem; Robert K. Mattson; Thomas Teramura, both of Albany, all of Oreg.

[73] Assignee: Titanium Metals Corporation, Denver, Colo.

[21] Appl. No.: 928,850

[22] Filed: Sep. 12, 1997

[51] Int. Cl.[6] .................................................... C04B 35/48
[52] U.S. Cl. ........................ 501/105; 501/152; 427/419.2; 427/427
[58] Field of Search ...................................... 501/105, 152; 106/38.9; 427/419.2, 427

[56] References Cited

FOREIGN PATENT DOCUMENTS 405171261  7/1993  Japan .

*Primary Examiner*—Paul Marcantoni
*Attorney, Agent, or Firm*—Finnegan, Henderson, Farabow, Garrett & Dunner, L.L.P.

[57] ABSTRACT

A refractory composition of a yttria-based, fused, solid solution of yttria, alumina, and zirconia. The composition provides advantages when used in a slurry for forming mold facecoats for investment casting molds.

12 Claims, No Drawings

FACECOAT CERAMIC SLURRY AND METHODS FOR USE THEREOF IN MOLD FABRICATION AND CASTING

BACKGROUND OF THE INVENTION

1. Field of the Invention

The present invention relates to yttria-based slurries for use in producing ceramic molds for use in the investment casting of reactive metals, particularly titanium and titanium alloys.

2. Description of the Prior Art

Investment casting of reactive metals, such as titanium and titanium alloys, provides unique problems with respect to the molds employed in this application. These alloys, because of their highly reactive nature, have an affinity for oxygen, carbon, and nitrogen. At the temperatures employed in casting reactive metals, they tend to react with the refractory mold interior to form an oxygen enriched surface layer, commonly referred to as "alpha-case." This reaction layer must be removed by mechanical or chemical practices. This tends to adversely affect the desired dimensions of the casting, because the thickness of the alpha-case on the as-cast article may vary depending upon factors such as the solidification rate of the metal being cast. Close tolerances are critical in the investment casting of reactive metals including the investment casting of titanium and titanium alloys.

Zirconium oxide, mixed with a binder, is widely used in the titanium investment casting industry to form the mold facecoat. It acts as a relatively inert interface between the molten titanium or titanium alloy and the more reactive and less costly refractory materials comprising the main structure of the mold interior, which materials are typically various forms of silica, alumina, or alumino-silicates.

Yttrium oxide is known to provide an even more inert interface than zirconium oxide, when employed in mold facecoat applications. Problems exist, however, with respect to gelation of a slurry containing yttrium oxide as the refractory, as noted in U.S. Pat. Nos. 4,703,806 and 4,947,927. In U.S. Pat. No. 4,947,927, the cause of the gelation is linked to hydration of the yttria. U.S. Pat. No. 4,740,246 relates to the use of a fused mixture of zirconium oxide and yttrium oxide with and without the inclusion of elements within an atomic number of 57–71, as a slurry refractory material for providing an alpha-case of relatively low thickness. The relatively high cost of these constituents of the fused mixture for facecoat applications adds significantly to the cost of the overall casting operation.

SUMMARY OF THE INVENTION

It is an object of the present invention to provide a fused yttrium oxide, aluminum oxide, zirconium oxide refractory facecoat ceramic slurry that takes advantage of the inertness of yttria and zirconia with respect to contact with molten reactive metal, such as titanium and its alloys, while using the additional, less expensive alumina as a component of the composition. Alumina, in addition to being inexpensive and widely available, demonstrates high stability with various binders used with the fused three-component composition in accordance with the invention.

In accordance with the invention and to achieve the objects thereof, a refractory composition is provided of a fused yttria-based, solid solution of yttria, alumina, and zirconia. The preferred composition limits, in weight percent, are at least 50 yttria, 1 to 49 alumina, and 1 to 49 zirconia; at least 56 yttria, 1 to 43 alumina, and 1 to 43 zirconia; at least 60 yttria, 1 to 39 alumina and 1 to 39 zirconia; and more preferably about 60 yttria, 20 zirconia and 20 alumina. The refractory composition is in the form of a slurry of the fused solid solution. The slurry may be a mixture of the refractory composition and an aqueous binder.

The binder in the slurry may be an inorganic binder. Specific preferred compositions are ammonium zirconium carbonate, zirconium acetate, and colloidal silica.

Further in accordance with the invention, a method is provided for fabricating a mold for use in casting reactive metals, specifically titanium and titanium alloys. The method includes the use of a slurry of the yttria-based, fused, solid solution of yttria, alumina, and zirconia, with a binder. The slurry is used as a mold facecoat by applying the slurry onto a surface of a mold pattern.

"Solid solution" as used herein means a homogenous solidified mass resulting from the solidification of the refractory components that have been combined and melted to form a homogeneous molten solution.

"Fused" as used herein means heating the solid individual refractory components to form the homogeneous molten solution.

Further in accordance with the practice of the invention, the yttria-based, fused, solid solution is crushed, ground, to the desired particle size. The particles are combined with a binder to form a slurry. The slurry is placed in a tank into which the wax mold pattern is submerged for application of the facecoat.

DESCRIPTION OF THE PREFERRED EMBODIMENTS

In accordance with the demonstration and development of the invention, tests were performed using a fused solid solution of, in weight percent, 60% yttria, 20% zirconia, and 20% alumina (YAZ). This composition was fused and then comminuted to form powder. The powder was mixed with a binder of ammonium zirconium carbonate (AZC) to form a slurry. The slurry was placed into two bottles of about 700 ml each and onto a roll mill for agitation to prevent settling of the components. The slurry from these bottles was placed into a third bottle to provide a total content of 400 ml and onto the roll mill for agitation to prevent settling of the components. All three bottles were mixed together in a container with various chemical enhancements. The specific testing times and conditions are set forth on the following tables along with the test results.

| INITIAL TESTING OF THE TREIBACHER EXPERIMENTAL POWDER |
|---|

Powder: 60% 20% 20% Yttria/Zirconia/Alumina (Lot No. YAZ1/95)
Binder: Ammonium Zirconium Carbonate (AZC) or Azcote (Lot No. 3925)
Initial calcuation of powder to binder ratio based on 30 lb/gal → 2696 g/750 ml
Initial AZC temperature = 20° C.
Initial AZC volume = 750 ml
Powder was mixed into the AZC using a motorized stirrer; as follows:

| Date/Time | Powder Added (g) | Total Powder (g) | #5 Zahn Viscosity (Sec) | Density (g/ml) | pH |
|---|---|---|---|---|---|
| 2/7/96, 0950 | 2700 | 2700 | 4 | | |
| | 250 | 2950 | 4.1 | | |
| | 250 | 3200 | 4.7 | | |
| | 500 | 3700 | 6 | | |
| | 500 | 4200 | 11.7 | 3.37 | 10.21 |

Total volume after powder additions: 1400 ml (est.)
2/7/96, slurry was placed into two bottles, about 700 ml each, and onto a roll mill.
2/8/96, slurry from bottles 1 and 2 placed into a third bottle, 400 ml total, and onto the roll mill.
2/14/96, all three bottles mixed together in a large container (see page 3).

Bottle #1

| Date/Time | Powder Added (g) | AZC Added (ml) | Temp. (°C.) | #5 Zahn Viscosity (sec) | Density (g/ml) | pH |
|---|---|---|---|---|---|---|
| 2/8/96, 0750 | | | 21 | 42 | 3.39 | 10.23 |
| Drained bottle to about the 500 ml level: | | | | | | |
| 2/8/96, 0900 | | 200 | | 5 | | |
| 2/9/96, 0800 | | | | 5.2 | 2.85 | |
| 2/12/96, 0805 | | | 20 | 5.9 | 2.84 | 10.3 |
| 2/13/96, 0800 | | | | 6.2 | 2.83 | |
| 2/14/96, 0800 | | | | 6.6 | 2.86 | |
| 2/14/96, 0815 | Added 10 drops PS 9400 wetting agent and 10 drops antifoam solution (60.300, Dow 1410) (10 drops 0.5 ml) | | | | | |

Wax Testing:

Untreated: Extensive pull-back, flaky (curled) when dry.
Stoner sprayed:. Slight pull-back, adhered to wax.
Untreated/alcohol/latex: No pull-back, adhered to wax.
Stoner sprayed/alcohol/latex: No pull-back, adhered to wax.

Bottle #2

| Date/Time | Powder Added (g) | AZC Added (ml) | Temp. (°C.) | #5 Zahn Viscosity (sec) | Density (g/ml) | pH |
|---|---|---|---|---|---|---|
| 2/8/96, 0750 | | | 21 | 40 | 3.39 | 10.24 |
| Drained bottle to about the 500 ml level. | | | | | | |
| 2/8/96, 0915 | | 50 | | 10.2 | | |
| 2/9/96, 0800 | | | | 15 | 3.22 | |
| 2/9/96, 0900 | | 5 | | 14.2 | | |
| 2/9/96, 1000 | | 5 | | 13.5 | | |
| 2/12/96, 0755 | | | 20 | 19.1 | 3.17 | 10.26 |
| 2/12/96, 1000 | | 10 | | 15.3 | | |
| 2/12/96, 1100 | | 8 | | 12.9 | | |
| 2/13/96, 0810 | | | | 14.3 | 3.13 | |
| 2/14/96, 0740 | | | | 15.4 | 3.15 | |

Bottle #3

| Date/Time | Powder Added (g) | AZC Added (ml) | Temp. (°C.) | #5 Zahn Viscosity (sec) | Density (g/ml) | pH |
|---|---|---|---|---|---|---|
| 2/8/96, 0750 | Slurry from bottles 1 and 2 (about 400 ml) | | 21 | 41 | 3.39 | 10.24 |
| 2/8/96, 0930 | | 25 | | 15.2 | | |
| 2/9/96, 0800 | | | | 21.1 | 3.3 | |
| 2/9/96, 0915 | | 10 | | 15.1 | | |
| 2/9/96, 1015 | | 10 | | 11.7 | | |
| 2/12/96, 0745 | | | 20 | 17.3 | 3.19 | 10.25 |
| 2/12/96, 1000 | | 10 | | 13.4 | | |
| 2/13/96, 0820 | | | | 14.8 | 3.15 | |
| 2/14/96, 0752 | | | | 15.2 | 3.18 | |

-continued

| | INITIAL TESTING OF THE TREIBACHER EXPERIMENTAL POWDER | | | | | |
|---|---|---|---|---|---|---|
| | Combination of Bottles 1, 2, and 3 | | | | | |
| Date/Time | Powder Added (g) | AZC Added (ml) | Temp. (°C.) | #5 Zahn Viscosity (sec) | Density (g/ml) | pH |
| 2/14/96, 1020 | Mixed all three bottles together and added 16 drops of PS-9400 and 16 drops of anti-foam for a total of 26 drops of each. Also added about 15 ml of binder used to rinse out the bottom of the three bottles. The total volume of slurry is now about 1600 ml. | | | | | |
| 2/14/96, 1040 | | | | | | 7.5 |
| Wax Testing: | | | | | | |
| Untreated: Extensive pull-back, flaky (curled) when dry. | | | | | | |
| Stoner sprayed: Slight pull-back, adhered to wax. | | | | | | |
| Untreated/alcohol/latex: No pull-back, adhered to wax. | | | | | | |
| Stoner sprayed/alcohol/latex: No pull-back, adhered to wax. | | | | | | |
| 2/15/96, 0800 | | | | 8 | 2.98 | 10.27 |
| 2/16/96, 0745 | | | | 10.1 | 3 | |
| 2/19/96, 0800 | | | | 12.3 | 3.01 | |
| 2/20/96, 0800 | | | | 13 | 3.01 | |
| 2/21/96, 0800 | Approx. Slurry Volume = 1200 ml | | | 13.5 | 3.01 | 10.27 |
| 2/22/96, 0800 | | | | 14.2 | 3 | |
| 2/23/96, 0800 | | | | 15.1 | 3.01 | |
| 2/26/96, 0800 | | | | 16.3 | 2.99 | 10.31 |
| 2/27/96, 0800 | | | | 16.4 | 2.98 | |
| 2/28/96, 0800 | | | | 16.7 | 2.99 | |
| 2/28/96, 0930 | | 20 | | 12.8 | | |
| 2/29/96, 0930 | | | | 13 | 2.96 | |
| 3/1/96, 1400 | | | | 13.5 | | |
| 3/4/96, 0800 | Approx. Slurry Volume = 900 ml | | | 16.3 | 2.96 | 10.29 |
| 3/4/96, 0930 | | 20 | | 11.8 | | |
| 3/5/96, 0800 | | | | 11.6 | 2.94 | |
| 3/6/96, 0800 | | | | 11.6 | 2.97 | |
| 3/7/96, 0800 | | | | 11.5 | | |
| 3/8/96, 0800 | | | | 11.6 | 2.96 | |
| 3/11/96, 1100 | | | | 13 | 2.96 | 10.22 |
| 3/12/96, 0900 | | | | 13.1 | | |
| 3/13/96, 1100 | | | | 13.3 | | |
| 3/14/96, 1000 | | | | 13.8 | | |
| 3/15/96, 1300 | | | | 14.2 | | |
| 3/18/96, 1100 | Approx. Slurry Volume = 800 ml | | | 15.6 | | 19.15 |
| 3/18/96, 1100 | Added 16 ml (2% of slurry vol.) of 1% Amoloid LV solution. | | | 12.9 | | |
| The 1% Amoloid LV solution was prepared by heating 100 DI water to >160° F., then while stirring with the mixer, adding 1 gram of Amoloid particles. After all particles were dissolved, the mixture was allowed to cool before adding to slurry. | | | | | | |
| 3/18/96, 1300 | | | | 14.1 | | 10.09 |
| Wax Testing: | | | | | | |
| Untreated: Little pull-back, some sagging. | | | | | | |
| Stoner sprayed: Excessive pull-back, some sagging. | | | | | | |
| Untreated/alcohol/latex: No pull-back, some sagging. | | | | | | |
| 3/18/96, 1345 | | 13 | | | 2.88 | |
| 3/18/96, 1440 | | | | 11.8 | 2.89 | |
| 3/19/96, 0900 | | | | 11.8 | 2.91 | 10.06 |
| 3/19/96, 1400 | Added 5 drops of Turgitol 1X to ~23 grams of slurry-did not gel up. Added 16 ml of Turgitol 1X to the ~800 ml slurry. | | | | | |
| 3/20/96, 1100 | | | | 12.1 | 2.84 | 10.07 |
| 3/21/96, 0600 | | | | 12.5 | 2.88 | 10.06 |
| 3/22/96, 1400 | | | | 12.8 | 2.88 | 10.1 |
| 3/22/96, 1415 | Measured the pH of Reichhold Tylac 68010-01 FTHL batch 8620150184 at 10.28 | | | | | |
| 3/22/96, 1430 | Added 10% by volume of Latex to the slurry (80 ml). | | | | | |
| 3/22/96, 1545 | Slurry texture is now GRAINY, with the appearance of small particles; the slurry is no longer flowing smoothly | | | 11.6 | 2.65 | |
| 3/25/96, 0800 | Grainy texture, not smooth flowing. | | | 14.5 | 2.64 | 10.02 |
| 3/25/96, 0900 | Mixed some Latex and binder (AZC). Result was a congealing effect. The Latex + B180 and AZC are not compatible. Disposed of the slurry. | | | | | |

| INITIAL TESTING OF THE TREIBACHER EXPERIMENTAL POWDER |
|---|
| TEST PATTERN INFORMATION: The club and iron with notches (top of mold when upside-down) are dipped with existing slurry, while the remainder of the pattern was dipped in this experimental slurry. |

-continued

| | |
|---|---|
| 2/15/96, 0900 | Hand poured a pattern with the slurry and sanded it. Two of the items were dipped in the normal prime slurry and later attached to the sprue. (Pattern weight is 7 lb. 10 oz.) |
| 2/15/96, 1500 | Applied first back-up coat. |
| 2/20/96, 0800 | Completed 8 back-up dips and seal coat on pattern. |
| 2/27–2/28/96 | Conducted burnout of the mold. |
| 2/28/96 | Cast the step mold. |
| 3/4/96 | MET LAB results attached for alpha case. |

As can be seen from the above test reports, formulations of the yttria-based, fused, solid solutions in accordance with the invention were blended with AZC binder to form slurries. These slurries demonstrated significant longevity, as compared to conventional yttria-based slurries, when tested under conditions simulating use in typical investment casting operations.

Additional similar trials were performed with respect to the same yttria-based fused composition and binder and the specific times and conditions along with the results of these trials are set forth in the following table. The data shows that the slurry in accordance with the invention demonstrated longevity for a period of eight days.

Two refractory powder mixtures in accordance with the invention of different ratios (60-20-20 and 90-5-5) of yttria/alumina/zirconia (termed "YAZ") were tested using four different binders: ammonium zirconium carbonate (AZC), zirconium acetate (ZA), and two conventional, commercial grades of colloidal silica identified as Ludox Sm and Ludox HS-30.

Data for slurries using alumina, yttria/alumina (YA), and yttria/zirconia (YZ) powders with AZC or ZA are also included as information for benchmarking performance.

| Second Trials of the YAZ-AZC (High Performance) Primary Slurry |
|---|
| Powder: 60% 20% 20% Yttria/Zirconia/Alumina (Lot No. YAZ 1/95) |
| Binder: Ammonium Zirconium Carbonate (AZC), or Azcote (Lot No. 4257) |
| Initial AZC volume = 750 ml. |
| Powder was mixed into the AZC using a motorized stirrer as follows: |

| Date/Time | Powder Added (g) | AZC Added (ml) | #5 Zahn Viscosity (sec.) | Density (g/ml) |
|---|---|---|---|---|
| 7/22/96, 0800 | 7400 g (initial) | 1500 ml (initial) | 9.1 | |
| 7/23/96, 0730 | | | 31.5 | 3.22 |
| 7/23/96, 0830 | | 150 | 17.5 | |
| 7/24/96, 0800 | | | 28 | |
| 7/24/96, 1330 | | 100 | 19 | |
| 7/24/96, 1400 | | 50 | | |
| 7/25/96, 0900 | | | 22 | 3.07 |
| 7/25/96, 0915 | | 75 | 14.7 | |
| 7/26/96, 0730 | | | 21 | 3.04 |
| 7/26/96, 1300 | | 125 | 14.2 | |
| 7/29/96, 0730 | | | 27 | |
| 7/29/96, 0800 | | 125 | 15 | |
| 7/31/96, 0800 | | | 22.5 | |
| 7/31/96, 0830 | Est. Vol. = 1700 ml | 50 | | |
| 7/31/96, 0850 | Added 35 ml Turgitol 1X | | | |
| 7/31/96, 1020 | | | 19.4 | |
| 7/31/96, 1030 | | 25 | | |
| 7/31/96, 1030 | Added 35 ml of 1% Amoloid LV solution. | | | |
| 7/31/96, 1230 | Unetched wax test: Smooth, no bubbles, sharp line. Pattern dried quickly and slurry layer formed a crack pattern which readily flaked off the wax | | 15.4 | |
| 7/31/96, 1030 | Added 20 ml of 1% Amoloid LV solution. | | | |
| 7/31/96, 1400 | First dip test on a pattern. Had difficulty applying the first coat using both a spray gun and then pouring the slurry over the wax pattern. Upon sanding, the dip sagged severely and dripped off the wax. Big mess! | | | |

| Materials Used in the YAZ Evaluations | | |
|---|---|---|
| | Materials | Manufacturer |
| Powders | Tabular Alumina, −325 mesh | Alcoa |
| | Zirconia, −325 mesh | Tam Ceramics |
| | Yttria/Alumina/Zirconia (Various PSD's) 60%-20%-20% and 90%-5%-5% | Treibacher Auermet (Austria) |
| Binders | Ammonium Zirconium Carbonate Solution | Hopton Technologies, Inc. |
| | Zirconium Acetate Solution/22% Acetic Acid Mixture | Magnesium Elektron |
| | Ludox SM (colloidal silica) | DuPont |
| | Ludox HS-30 (collidal silica) | DuPont |
| Wetting Agent | PS9400 | Buntrock |
| Defoaming Agent | DOW1410 | Dow Corning |

Observations on Different Slurry Systems (Primarily YAZ Related, with Others as a Comparison)

All viscosity values were determined with a No. 5 Zahn cup.
General binder usage results at a slurry age of 14 days:
For Ammonium Zirconium Carbonate Binder:
  The 60/20/20 YAZ required about four times the binder of a zirconia powder.
  The 90/5/5 YAZ required about 27 times the binder of a zirconia powder.
  The 90/5/5 YAZ required about 7 times the binder of the 60/20/20 YAZ.
For Zirconium Acetate Binder:
  The 60/20/20 YAZ required about 1.3 times the binder of a zirconia powder.
  The 90/5/5 YAZ requires about 8 times the binder than a zirconia powder.
  The 90/5/5 YAZ requires about 6 times the binder than the 60/20/20 YAZ.
For Colloidal Silica (HS-30) Binder:
  The 60/20/20 YAZ requires about 1.1 times the binder of a zirconia powder.
  The 90/5/5 (lot 34) YAZ requires about 2.0 times the binder of a zirconia powder.
  The 90/5/5 (lot 62) YAZ requires about 1.7 times the binder of a zirconia powder.
  The 90/5/5 YAZ requires about 1.6–1.8 times the binder than the 60/20/20 YAZ.
For Colloidal Silica (SM) Binder:
  The 60/20/20 YAZ was not tested with this binder.
  The 90/5/5 (lot 34) YAZ requires about 1.3 times the binder of a zirconia powder.
  The 90/5/5 (lot 62) YAZ requires about 1.2 times the binder of a zirconia powder.

The Ammonium Zirconium Carbonate binder demand was about 4 times the demand for Zirconium Acetate binder in both the 90/5/5 and the 60/20/20 YAZ powders.

The Ammonium Zirconium Carbonate binder demand was about 3.9 times the demand for Colloidal Silica (HS-30) binder in the 60/20/20 YAZ powder and about 9.8–12.6 times for 90/5/5 YAZ powder (depending on particle size distribution, coarse v. fine).

By far, the Colloidal Silica binder demand was the lowest for all YAZ powders.

Yttria/AZC
99.9% Yttria Powder from Treibacher, Austria, lot no. 40A/94.
Initial formulation 500 g/1 liter AZC.
Hydration of the yttria resulted in rapidly rising viscosity (5 sec to >60 sec in the first four hours).
After 48 hours, the amount of binder had been quadrupled to try to keep viscosity low with little success (6 sec to >60 sec in 15 hours).
Testing was stopped about 48 hours. Status: 1000 g powder in 2000 ml AZC, viscosity>60 sec. The system was too difficult to control.
The addition of ammonium carbonate or ammonia solution may have slowed the rate of viscosity increase, but this possibility was not evaluated.

Zirconia/AZC
The standard formulation is 100 pounds into 8 liters (or 5680 g/1 liter AZC). This results in a viscosity between 10 and 20 sec with no rapid or large changes occurring during creaming-out. The viscosity slowly rises with the evaporation of liquids from the slurry.

Zirconia/AZC
The standard formulation is 100 to 120 pounds into 8 liters (or 5860–6820 g/1 liter AZC). This results in a viscosity between 7 and 9 sec with no rapid or large changes occurring during creaming-out (the viscosity increased slowly). In an initial batching of 600 pounds powder into 40 liters AZC, 9 liters of AZC was added in the first 14 days to maintain viscosity around 12 sec (a 23% increase in the amount of AZC). The viscosity slowly rises with evaporation of liquids from the slurry.

YAZ (60%/20%/20%)/AZC
Yttria/Alumina/Zirconia (60%/20%/20% solid solution from Treibacher, Austria, was supplied in two lots:

| Lot No. & Size | BET (m$^2$/gram) |
|---|---|
| YAIZ1/95 (55 lbs) | 0.51 |
| YAIZ1/96 (500 lbs) | 0.49 |

"BET" is defined as a measurement technique for the surface area of fine powders, which utilizes the Brunaeur-Emmett-Teller equation.

Using an initial formulation of 4000 g/1 liter AZC, the viscosity increased to >60 sec in 24 hours. An additional 1.1 liters (per initial liter) of AZC was added over the next 5 days to maintain viscosity under 20 sec, most being added in the first 2 days.

Using an initial formulation of 2000 g/1 liter AZC, the viscosity increased slowly over the first 3 days. Frequent additions of AZC binder were required over the next few days to maintain viscosity between 10 and 20 sec. Binder demand slowed over time, i.e., after the first 10 to 14 days.

The binder demand for YAZ Lot No. YAIZ1/96 (583–625 ml/1000 g) was significantly greater than that for Lot No.

YAIZ1/95 (267–297 ml/1000 g). The surface area of the two different YAZ lots were very close. The difference in properties of the two AZC binder lots may have been a contributing factor.

The use of the thin formulations (2400 g/1 liter) resulted in the formation of soft agglomerates, which were broken up by rapid mixing. A thinner formulation (2000 g/1 liter) also resulted in the formation of agglomerates, but these agglomerates were more difficult to break up. This may have been due to the fact that the surface charge of the refractory particle is reduced when excess liquid is present, resulting in particles falling from suspension and then agglomerating.

It was established that to prevent the formation of agglomerates, the initial batching requirement of 3000 grams powder/1 liter AZC binder at initial mixing, with viscosity testing every 12 hours and thinning as needed to a viscosity of about 10 sec. On etched wax test pieces, the slurry was adherent (but not to the extent of zirconia). This powder/binder system appeared to display the best slurry properties.

Surfactant usage: 1.5 ml/1 liter of slurry.
Antifoam usage: 1.0 ml/1 liter of slurry.
YAZ (60%/20%/20%)/Zirconium Acetate
Yttria/Alumina/Zirconia (60%/20%/20%) solid solution from Treibacher, Austria was obtained in one lot:

| Lot No. & Size | BET (m$^2$/gram) |
|---|---|
| YAIZ1/96 (500 lbs) | 0.49 |

Using an initial formation of 5500 g/1 liter ZA, the viscosity rose very slowly over the first 7 days (4 sec to 11 sec). The pH of the slurry rose from 4.0 to 4.8 over the first 4 days, then tended to stabilize as small binder additions were made to maintain viscosity. A higher initial viscosity was achievable with higher solids loading, but this resulted in the need for binder additions to thin the slurry during the first 48 hours after slurry preparation.

On etched wax test pieces, the slurry was adherent (not to the extent of zirconia, but better than that achieved with YAZ 60/20/20 powder with AZC binder).

The slurry was very bubbly until the antifoaming agent was added.

Surfactant usage: 1.0 ml/1 liter of slurry.
Antifoaming agent usage: 1.0 ml/1 liter of slurry.
YAZ (90%/5%/5%)/ AZC
Yttria/Alumina/Zirconia (90%/5%/5%) solid solution was obtained from Treibacher, Austria, as follows:

| Lot No. & Size | BET (m$^2$/gram) |
|---|---|
| NPE62/97 (coarse) | 0.50 |
| NPE50/97 (standard) | 0.64 |
| NPE34/97 (medium) | 0.53 |
| NPE38/97 (fine) | 0.47 |

Four particle sizes were evaluated. The standard grind lot NPE50/97 was milled to resemble the original 60/20/20 material (YA1Z1/96). Lot NPE34/97 was designed to resemble the particle size distribution (PSD) of the zirconia. Both the medium and fine lots had a significantly lower BET value. The BET data indicated an increasing surface area for the fine through standard powders.

For the medium and fine lots, initial formulations of 900 g to 300 ml AZC produced a viscosity of about 5.5 upon mixing and a moist solid block within 18 hours. Resuspension was possible with additional liquid and mixing. Additions of 14% ammonia solution were made to boost pH (a preferred pH of over 10.2 has been referred to in various patents relating to yttria, including U.S. Pat. Nos. 5,221,336 and 4,947,927) but this resulted in a rapid viscosity rise. Additions of water made to reduce this effect resulted in a more controllable viscosity over time. Large daily additions of liquid were required to keep the viscosity between 5 and 20 sec. Slurries with ammonia solution in high concentrations also tended to form a film quite quickly on a wax test piece. This is probably a result of the loss of ammonia producing a rapid drying effect. The use of ammonia as a liquid to control viscosity is not feasible with this binder system.

A subsequent formulation of 450 g to 300 ml AZC produced a viscosity of about 5 upon mixing and a high, syrup-like viscosity after 24 hours. Daily additions of 150 ml of AZC binder (minimum) were needed over the next 4 days to keep the viscosity under 30 seconds when subjected to the viscometer testing, after which the hydration rate slowed.

Another even later formulation of 225 g to 300 ml AZC produced a viscosity of about 4.5 seconds upon mixing and a minimal rise after 24 hours. However, the formation of soft agglomerates was a problem with this formulation. The addition of alumina milling balls to the mixing container made break up of the agglomerates possible.

The addition of an AZC/water combination produced a creamier slurry than AZC alone, but also resulted in a higher overall liquid to powder ratio. One concern of adding too much water is the resultant reduction in binder solids content and related ability of the binder to bind particles together. Testing with ratios of AZC/water to produce a 20% and a 25% effective binder solids were conducted. The use of water as a liquid to control viscosity is not feasible with this binder system.

The large liquid demand also results in a very low slurry density of 1.7–1.8 g/ml initially, and dropping to 1.3–1.6 g/ml after 7–12 days, as opposed to the typical 3.3–3.5 g/ml for a zirconia slurry. The slurries in which water was added produced lower densities than those slurries to which only AZC was added.

For the standard grind, about the same liquid demand is required. No decrease for liquid demands due to the larger PSD was noted.

For the coarse grind, a small rise in liquid demand was noted, rather than a decrease due to the larger PSD, as expected.

On etched wax test pieces, the slurry was not adherent. Significant shrinkage resulted in cracking of the slurry upon drying. The dried slurry could be blown off the wax pattern. Sanding did not improve the situation. On test bars, prime slurry cracking was noted and backup slurry penetrated to the surface of the wax. Also, the prime slurry displayed a rough surface and could easily be rubbed off of the wax test piece.

Surfactant usage: About 5.0 ml/1 liter of slurry
Antifoaming Agent usage: about 5.0 ml/1 liter of slurry, although it was only added to bottles which exhibited foaming. In two cases, the addition of an antifoaming agent resulted in blotchiness of the slurry. The high liquid demand implies more frequent additions of these materials will be needed.

YAZ (90%/5%/5%)/ZA
Yttria/Alumina/Zirconia (90%/5%/5%) solid solution was obtained from Treibacher, Austria, as follows:

| Lot No. | BET (m²/gram) |
|---|---|
| NPE34/97 | 0.53 |

The standard grind was not tested with ZA due to limited quantity.

Using an initial formulation of 2000 g/1 liter ZA, viscosity rose very slowly over time.

On etched wax test pieces, the slurry was somewhat adherent. The prime slurry looked smooth on test bars and was adherent. On test bars, prime slurry cracking was not noted, although the prime slurry displayed a rough surface and could easily be rubbed off of the test bar.

YAZ (95%/0%/5%)/AZC (or Yttria/Zirconia Powder)

Yttria/Zirconia (95%/5%) solid solution was obtained from Treibacher, Austria.

The binder demand was about 6 times that of YAZ (60/20/20)/AZC.

YAZ (95%/0%/5%)/Zirconium Acetate (or Yttria/Zirconia Powder)

Yttria/Zirconia (95%/5%) solid solution was obtained from Treibacher, Austria.

Tested in small amounts, the binder demand was about 6 times that of YAZ (60/20/20)/ZA.

YAZ (95%/5%/0%)/AZC (or Yttria/Alumina Powder)

Yttria/Alumina (95%/5%) solid solution was obtained from Treibacher, Austria, as follows:

| Lot No. | BET(m²/gram) |
|---|---|
| NPE51/97 | 0.58 |

Tested in small amounts the binder demand was about 8 times that of YAZ (60/20/20) powder and about 1.3 times that of YAZ (95/0/5) powder.

Zirconia/Colloidal Silica (HS-30)

Using an initial formulation of 5280 g/l of colloidal silica (CS), viscosity decreased very slowly over time, resulting in the need for powder additions to keep viscosity in the desired range. The slurry was very stable.

On etched wax test pieces, the slurry was very adherent. The slurry appeared smooth on test bars and was adherent. Cracking was not noted.

Zirconia/CS (SM)

Viscosity slowly decreased over time, resulting in the need for powder additions to keep viscosity in the desired range. The slurry was very stable and adhered to wax test pieces. Cracking was not noted.

YAZ (60%/20%/20%)/CS (HS-30)

Yttria/Alumina/Zirconia (60%/20%/20%) solid solution from Treibacher, Austria, provided as follows:

| Lot No. | BET (m²/gram) |
|---|---|
| YA1Z1/96 (500 lb) | 0.49 |

Using an initial formulation of 5500 g/1 liter HS-30, viscosity slowly rose over time.

On etched wax test pieces, the slurry was adherent, but not quite to the extent of the zirconia/HS-30 binder. The slurry looked smooth on test bars and was very adherent. Cracking was not noted. Slurry adherence for this material was better than for the 90/5/5 YAZ:HS-30 combination. Testing on large complex parts showed promise; a strong adherent facecoat with no spalling after dewax and firing.

The low demand for binder also resulted in densities which were much higher than that of the YAZ/AZC slurries or the YAZ/ZA slurries. This was part of the reason for the better adherence to patterns.

YAZ (90%/5%/5%)/CS (HS-30)

Yttria/Alumina/Zirconia (90%/5%/5%) solid solution from Treibacher, Austria was obtained as follows:

| Lot No. | BET (m²/gram) |
|---|---|
| NPE62/97 | 0.50 |
| NPE34/97 | 0.53 |

Using an initial formulation of 4000 g/1 liter HS-30 binder, viscosity rose very slowly over a time with both powders. Lot 34 required slightly more binder than the coarser lot 62, as expected due to PSD differences.

On etched wax test pieces, the slurry was adherent, but not to the extent of the zirconia/HS-30 binder. The slurry looked smooth on test bars, but a lot of bubbles were noted. The slurry was adherent and cracking was not noted. No antifoam was added to the slurry.

YAZ (90%/5%/5%)/CS (SM)

Yttria/Alumina/Zirconia (90%/5%/5%) solid solution from Treibacher, Austria was obtained as follows:

| Lot No. | BET (m²/gram) |
|---|---|
| NPE62/97 | 0.50 |
| NPE34/97 | 0.53 |

Using an initial formulation of 4000 g/1 liter SM binder, viscosity slowly rose and then later slowly decreased over time. Lot 34 required slightly more binder than the coarser lot 62, as expected due to PSD differences.

On etched wax test pieces, the slurry was adherent, but not to the extent of the zirconia/HS-30 binder. The slurry looked smooth on test bars, but a lot of bubbles were noted. The slurry was adherent and cracking was not noted. No antifoam was added to the slurry.

The following three tables summarize the liquid demands for each of the slurry mixtures. Specifically, the data in these three tables show that the three-component refractory based slurries in accordance with the invention exhibit better stability than the conventional one or two component refractory based slurries.

| SLURRY | INITIAL | 4 DAYS | 14 DAYS |
|---|---|---|---|
| AZC BINDER USAGE RATES (and slurry density) | | | |
| Yttria | 2000 ml/Kg (initial visc. = 4–5 sec.) | Solid @ 2 days (not controllable for this length of time) | N/A |
| Zirconia | 175 ml/Kg (initial visc. = 10–15 sec.) | 180 ml/Kg | 186 ml/Kg |
| Zirconia | 150 ml/Kg (initial visc. = 10–15 sec.) | 160 ml/Kg | 175 ml/Kg |
| YAZ (60%/20%/20%) (Std. PSD) | 500 ml/Kg (initial visc. = 4–5 sec.) | 580 ml/Kg (3.04) | 710 ml/Kg (2.20) |
| YAZ (90%/5%/5%) (Coarse PSD, Lot 62) | 750 ml/Kg (initial visc. 4–5 sec.) | 2750 ml/Kg | 3650 ml/Kg @ 7 days (stopped testing) |
| YAZ (90%/5%/5%) (Std. PSD, Lot 50) | 1500 ml/Kg (initial visc. = 4–5 sec.) | 2200 ml/Kg (1.67) | 5025 ml/Kg (1.47) |
| YAZ (90%/5%/5%) (Med. PSD, Lot 34) | 1330 ml/Kg (initial visc. = 4–5 sec.) | 1890 ml/Kg | 3210 ml/Kg (1.56) |
| YAZ (90%/5%/5%) (Fine, Lot 38) | 1330 ml/Kg (initial visc. 4–5 sec.) | 1890 ml/Kg (1.62) | 3100 ml/Kg (1.55) |
| YZ (95%/5%) (Std. PSD, Lot 12/93) | 1500 ml/Kg (initial visc. = 4–5 sec.) | 2000 ml/Kg (1.79) | 4525 ml/Kg (1.54) |
| YZ (80%/20%) (PSD, Lot 10/92) | 1000 ml/Kg (initial visc. = 4–5 sec.) | 1000 ml/Kg (1.94) | 2000 ml/Kg (2.11) |
| YA (95%/5%) (Std. PSD, Lot 51) | 1500 ml/Kg (initial visc. = 4–5 sec.) | 2570 ml/Kg | 5825 ml/Kg (1.46) |
| YA (67%/33%) (PSD, Lot 2/92) | 500 ml/Kg (initial visc. = 4–5 sec.) | 670 ml/Kg (2.23) | 800 ml/Kg (1.70) |
| ZIRCONIUM ACETATE BINDER USAGE RATES (and slurry density) | | | |
| Zirconia | 186 ml/Kg | 186 ml/Kg (3.40) | 186 ml/Kg (3.34) |
| YAZ (60%/20%/20%) (Std. PSD) | 200 ml/Kg (thin, initial visc. = 5 sec.) | 225 ml/Kg | 235 ml/Kg (2.78) |
| YAZ (90%/5%/5%) (Med. PSD, Lot 34) | 500 ml/Kg (thin initial visc. = 5 sec.) | 875 ml/Kg | 1480 ml/Kg (1.78) |
| YAZ (90%/5%/5%) (Coarse PSD, Lot 62) | 500 ml/Kg (thin, initial visc. = 5 sec.) | 800 ml/Kg | 1715 ml/Kg (1.29) |
| YZ (95%/5%) (Std. PSD, Lot 12/93) | 285 ml/Kg (thin, initial visc. = 5 sec.) | 835 ml/Kg | test not continued to 14 days |
| YZ (90%/20%) (PSD, Lot 10/92) | 500 ml/Kg (thin, initial visc = 5 sec.) | 500 ml/Kg (2.22) | 575 ml/Kg (2.42) |
| COLLOIDAL SILICA BINDER USAGE RATES (and slurry density) | | | |
| Zirconia/HS-30 | 192 ml/Kg (3.32) (initial visc. = 7 sec.) | 167 ml/Kg (3.38) | 167 ml/Kg (3.49) |
| Zirconia/SM | 192 ml/Kg (3.32) (initial visc. = 9 sec.) | 172 ml/Kg (3.37) | 172 ml/Kg (3.46) |
| YAZ (60%/20%/20%)/HS-30 (Std. PSD) | 182 ml/Kg (3.23) (initial visc. = 7 sec.) | 182 ml/kg (3.24) | 182 ml/Kg (3.22) |
| YAZ (60%/20%/20%)/SM (Std. PSD) | N/A | N/A | N/A |
| YAZ (90%/5%/5%)/HS-30 (Med. PSD, Lot 34) | 250 ml/Kg (2.82) (initial visc. = 8 sec.) | 275 ml/Kg (2.82) | 329 ml/Kg (2.65) |
| YAZ (90%/5%/5%)/HS-30 (Coarse PSD, Lot 62) | 250 ml/Kg (initial visc. = 4–5 sec.) | 250 ml/Kg (2.82) | 290 ml/Kg (2.75) |
| YAZ (90%/5%/5%)/SM (Med. PSD, Lot 34) | 250 ml/Kg (2.80) (initial visc. = 11 sec.) | 250 ml/Kg (2.81) | 267 ml/Kg (2.76) |
| YAZ (90%/5%/5%)/SM (Coarse PSD, Lot 62) | 250 ml/Kg (initial visc. = 4–5 sec.) | 250 ml/Kg (2.72) | 221 ml/Kg (2.89) |

| SUMMARY | | |
|---|---|---|
| SLURRY SYSTEM | INITIAL FORMULATION | VISCOSITY CHANGE |
| Yttria/AZC | 500 g/liter AZC | Increase: Very Rapid Rate |
| Zirconia/AZC | 5682 g/liter AZC (120 lb/8 L) | Increase: Very Slow Rate |

-continued

| | | |
|---|---|---|
| Zirconia/AZC | 6820 g/liter AZC (120 lb/8 L) | Increase: Very Slow Rate |
| Zirconia/ZA | 5375 g/liter ZA | Relatively Constant |
| Zirconia/CS | 5200 g/liter CS | Decrease: Very Slow Rate |
| YAZ (60%/20%/20%)/AZC | 2000 g/liter AZC | Increase: Fast to Moderate Rate |
| YAZ (60%/20%/20%)/ZA | 4500 g/liter ZA | Increase: Slow Rate |
| YAZ (60%/20%/20%)/Colloidal Silica (HS-30) | 5500 g/liter CS | Increase: Very Slow Rate |
| YAZ (95%/0%/5%)/AZC | 670 g/liter AZC (or less) | Increase: Fast Rate |
| YAZ (95%/0%/5%)/ZA | 2000 g/liter ZA | Increase: Fast to Moderate Rate |
| YAZ (90%/5%/5%)/AZC | 670 g/liter AZC (or less) | Increase: Fast Rate |
| YAZ (90%/5%/5%)/ZA | 2000 g/liter ZA (or less) | Increase: Slow Rate |
| YAZ (90%/5%/5%/)/Colloidal Silica (HS-30) | 4000 g/liter CS (or less) | Increase: Very Slow Rate |
| YAZ (90%/5%/5%)/Colloidal Silica (SM) | 4000 g/liter CS (or less) | Increase at Very Slow Rate Then Decrease Slowly |
| YAZ (95%/5%/0%)/AZC | 670 g/liter AZC (or less) | Increase: Fast Rate |

It may be seen from the test data reported and discussed above that the yttria-based, fused, solid solution of yttria, alumina, and zirconia, and slurries made therefrom, exhibit improved stability compared to conventional refractory compositions employed in the production of investment casting mold facecoats, while providing comparable adhesion properties. Consequently, with the compositions in accordance with the invention, slurries for these facecoat applications may be maintained for longer periods of time while retaining the viscosity required for investment casting than conventional compositions used for this purpose. This prolonged slurry service life significantly reduces slurry costs to in turn reduce the overall cost of the investment casting operation. This is particularly significant in view of the high cost of the yttria component.

What is claimed is:

1. A refractory composition comprising, in weight percent, a fused, solid solution of at least 50 yttria, 1 to 49 alumina and 1 to 49 zirconia.

2. The composition of claim 1, comprising, in weight percent, at least 56 yttria, 1 to 43 alumina, and 1 to 43 zirconia.

3. The composition of claim 2, comprising, in weight percent, at least 60 yttria, 1 to 39 alumina, and 1 to 39 zirconia.

4. The composition of claim 1, 2, or 3 comprising a slurry of said fused solid solution.

5. The composition of claim 4, wherein said slurry includes a binder.

6. The composition of claim 5, wherein said binder is an inorganic binder.

7. The composition of claim 6, wherein said inorganic binder is a composition selected from the group consisting of ammonium zirconium carbonate, zirconium acetate, and colloidal silica.

8. A method for fabricating a mold for use in casting reactive metals comprising preparing a slurry of a refractory composition comprising, in weight percent, a fused, solid solution of at least 50 yttria, 1 to 49 alumina, and 1 to 49 zirconia, and a binder, and using said slurry as a mold facecoat by applying said slurry onto a surface of a mold pattern.

9. The method of claim 8, wherein said composition comprises, in weight percent, at least 56 yttria, 1 to 43 alumina, and 1 to 43 zirconia.

10. The method of claim 9, wherein said composition comprises, in weight percent, at least 60 yttria, 1 to 39 alumina, and 1 to 39 zirconia.

11. The method of claim 8, 9, or 10, wherein said binder is an inorganic binder.

12. The method of claim 11, wherein said inorganic binder is a composition selected from the group consisting of ammonium zirconium carbonate, zirconium acetate, and colloidal silica.

* * * * *